(12) United States Patent
Mandaric

(10) Patent No.: US 10,513,305 B2
(45) Date of Patent: Dec. 24, 2019

(54) ASSEMBLY OF BICYCLE FRAME, FORK, AND HANDLEBAR STEM

(71) Applicant: Veselin Mandaric, San Marcos, CA (US)

(72) Inventor: Veselin Mandaric, San Marcos, CA (US)

( * ) Notice: Subject to any disclaimer, the term of this patent is extended or adjusted under 35 U.S.C. 154(b) by 0 days.

(21) Appl. No.: 15/283,298

(22) Filed: Oct. 1, 2016

(65) Prior Publication Data

US 2018/0093735 A1    Apr. 5, 2018

(51) Int. Cl.
*B62K 19/32* (2006.01)
*B62K 21/18* (2006.01)

(52) U.S. Cl.
CPC .............. *B62K 19/32* (2013.01); *B62K 21/18* (2013.01)

(58) Field of Classification Search
CPC .......... B62K 19/32; B62K 3/02; B62K 21/02; B62K 21/18; B62K 2700/00
See application file for complete search history.

(56) References Cited

U.S. PATENT DOCUMENTS

| | | | | |
|---|---|---|---|---|
| 2005/0098979 A1* | 5/2005 | Horiuchi | ............... | B62K 19/32 280/279 |
| 2008/0100026 A1* | 5/2008 | Bouchez | ............... | B62K 19/32 280/279 |
| 2011/0049833 A1* | 3/2011 | Kinzler | ............... | B62K 25/005 280/276 |
| 2013/0076000 A1* | 3/2013 | Man | ...................... | B62K 19/32 280/279 |
| 2015/0128753 A1* | 5/2015 | Goring | .................. | B62K 19/32 74/502.6 |
| 2015/0259023 A1* | 9/2015 | Nago | .................... | B62K 21/12 280/279 |
| 2015/0298759 A1* | 10/2015 | Lanz | ..................... | B62K 21/12 280/279 |
| 2016/0280309 A1* | 9/2016 | Pacenti | ................. | B62K 21/18 |

\* cited by examiner

*Primary Examiner* — Joseph M Rocca
*Assistant Examiner* — Marlon A Arce
(74) *Attorney, Agent, or Firm* — Palomar Patent; Calif Tervo

(57) ABSTRACT

The present invention is an assembly of bicycle frame, fork, and handlebar stem that improves the safety and performance of bicycle riding by placing a mechanical bearing above the handlebar stem which reduces the torsional stress on the fork steering column.

10 Claims, 1 Drawing Sheet

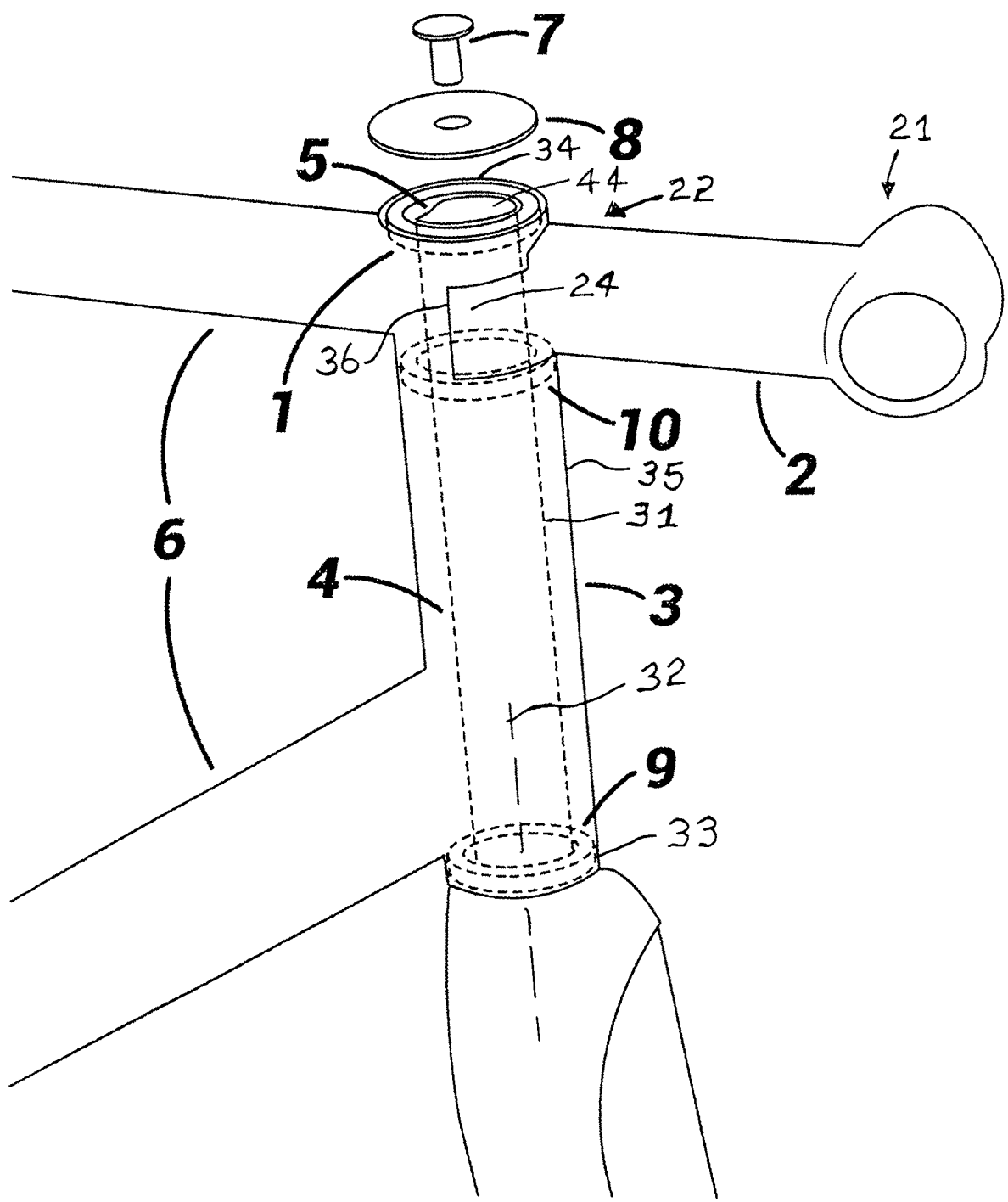

ASSEMBLY OF BICYCLE FRAME, FORK, AND HANDLEBAR STEM

FIELD OF THE INVENTION

This invention relates to a bicycle assembly of head tube and handlebar stem and method thereof.

BACKGROUND OF THE INVENTION

In traditional bicycle manufacturing, the handlebar stem is positioned above the top of the head tube. Furthermore, the fork steering column is inserted through the head tube and through one mechanical bearing at the bottom of the head tube and one mechanical bearing at the top of the head tube. Then the handlebar stem is slid over the protruding part of the fork steering column and secured.

Having the handlebar stem above the upper mechanical bearing creates a high amount of torsional stress on the fork steering column, between the handlebar stem and the upper mechanical bearing. This sometimes leads to fork steering column failure and even complete separation of the handlebar from the fork steering column, resulting in a loss of control over the bicycle and an unavoidable crash.

The present invention is directed towards a bicycle that provides a high-quality riding experience. The assembly of bicycle frame, fork, and handlebar stem is an area that can still be improved in order to provide the user a better and safer ride.

BRIEF SUMMARY OF THE INVENTION

The present invention is an assembly of bicycle frame, fork, and handlebar stem that improves the safety and performance of bicycle riding by placing a mechanical bearing above the handlebar stem which reduces the torsional stress on the fork steering column.

BRIEF DESCRIPTION OF THE DRAWING

The drawing is a depiction of the assembly of bicycle frame, fork, and handlebar stem from a three-dimensional perspective, with broken lines representing internal elements.

DETAILED DESCRIPTION OF THE INVENTION

Referring to the drawing, in the present invention, the issues expressed in the Background of the Invention are addressed by strengthening the region where the head tube 3, handlebar stem 2, and fork steering column 4 meet.

Handlebar stem 2 includes a front end 21 and a back end 22 that is inserted through an opening 36 in the front 35 of head tube 3 and into the bore 31 of head tube 3 of bicycle frame 6. A first mechanical bearing 1 is placed in the upper end 34 of head tube 3 in head tube bore 31 in the same axis 32 as bore 31 and directly above handlebar stem 2. Fork steering column 4 includes an upper end 44 that is inserted through the bottom 33 of head tube 3. Fork steering column 4 also passes through a third mechanical bearing 9 at bottom 32 of head tube 3 and a second mechanical bearing 10 directly below back end 22 of handlebar stem 2, the usual positions for mechanical bearings in a conventional bicycle headset design. Handlebar stem 2 is secured and compressed by a central bolt 7 inserted through a cap 8. Because of this arrangement, fork steering column 4 is under much less torsional stress. Handlebar stem 2 is aligned with the front wheel (not shown) of the bicycle by way of the non-circular cross-sectional shape 5 of the fork steering column 4 and matching vertical hole 24 inside back end 22 of handlebar stem 2 within bore 31 of head tube 3. The non-circular cross-sectional shape of hole 24 matches the cross-sectional shape 5 of steering column 4 such that steering column 4 fits snugly through hole 24 and prevents handlebar stem 2 from spinning around steering column 4.

What is claimed is:
1. A bicycle assembly comprising:
    a frame including:
        a head tube having an upper end; a bottom end; and a front including an opening therethrough;
    a handlebar stem including:
        a front end; and
        a back end; said stem disposed in said opening of said front of said head tube such that said back end is disposed within said head tube;
    a first mechanical bearing within said head tube directly above said back end of said handlebar stem in said head tube;
    a second mechanical bearing within said head tube directly below said back end of said handlebar stem in said head tube; and
    a steering column including:
        an upper end; said steering column disposed within said head tube, disposed within said second mechanical bearing, disposed within said first mechanical bearing, and connected to said back end of said handlebar stem.
2. The assembly of claim 1 wherein:
    said back end of said handlebar stem includes a hole of non-circular cross-sectional shape; and
    said steering column includes a non-circular cross-sectional shape fitting snugly within said hole such that rotating said handlebar stem rotates said steering column.
3. The assembly of claim 1 further including:
    a third mechanical bearing within said head tube bore near said bottom end of said head tube; and wherein said steering column is disposed within said third mechanical bearing.
4. The assembly of claim 3 wherein:
    said back end of said handlebar stem includes hole of non-circular shape; and
    said steering column includes a portion with a non-circular shape fitting snugly within said hole such that said handlebar stem rotates said steering column.
5. A bicycle assembly comprising:
    a frame including:
        a head tube including:
            a bore having an axis;
            an upper end;
            a bottom end; and
            a front including:
                an opening to said bore;
    a first mechanical bearing within said head tube bore having the same axis as said head tube bore; and
    a second mechanical bearing within said head tube bore having the same axis as said head tube bore;
    a handlebar stem including:
        a front end; and
        a back end; said stem disposed in said opening of said front of said head tube such that said back end is disposed within said bore below and near said first mechanical bearing and above and near said second mechanical bearing;

a steering column including:

an upper end; said steering column disposed within the head tube bore, disposed within said second mechanical bearing, disposed within said first mechanical bearing, and connected to said back end of said handlebar stem.

6. The assembly of claim 5 wherein:

said back end of said handlebar stem includes a hole of non-circular cross-sectional shape; and said steering column includes a non-circular cross-sectional shape fitting snugly within said hole such that rotating said handlebar stem rotates said steering column.

7. The assembly of claim 5 further including:

a third mechanical bearing within said head tube bore near said bottom end of said head tube; and wherein said steering column is disposed within said third mechanical bearing.

8. The assembly of claim 7 wherein:

said back end of said handlebar stem includes hole of non-circular shape; and said steering column includes a portion with a non-circular shape fitting snugly within said hole such that said handlebar stem rotates said steering column.

9. A method of assembling a bicycle including the steps of:

providing a frame including: a head tube including: a bore having an axis; an upper end; a bottom end; and a front including: an opening to the bore; a first mechanical bearing within the head tube bore directly above the opening and having the same axis as the head tube bore; and a second mechanical bearing within the head tube bore directly below the opening and having the same axis as said head tube bore;

providing a handlebar stem including: a front end; and a back end including hole of non-circular shape;

inserting the back end of the handlebar stem through the head tube opening into the bore;

providing a steering column including: an upper end; the column including a non-circular cross-sectional shape for fitting snugly within the hole such that when so fitted rotating the handlebar stem rotates the steering column; and inserting the steering column into the bottom end of the head tube bore, through the second mechanical bearing, thought the hole, and into the first mechanical bearing, such that the shaped portion of the steering tube fits with the hole of the handlebar stem.

10. The assembly of claim 9 wherein:

the provided frame further includes:

a third mechanical bearing within the head tube bore near the bottom end of the head tube; and the step of inserting the steering column includes:

inserting the steering column through the third mechanical bearing.

* * * * *